United States Patent Office 3,456,696
Patented July 22, 1969

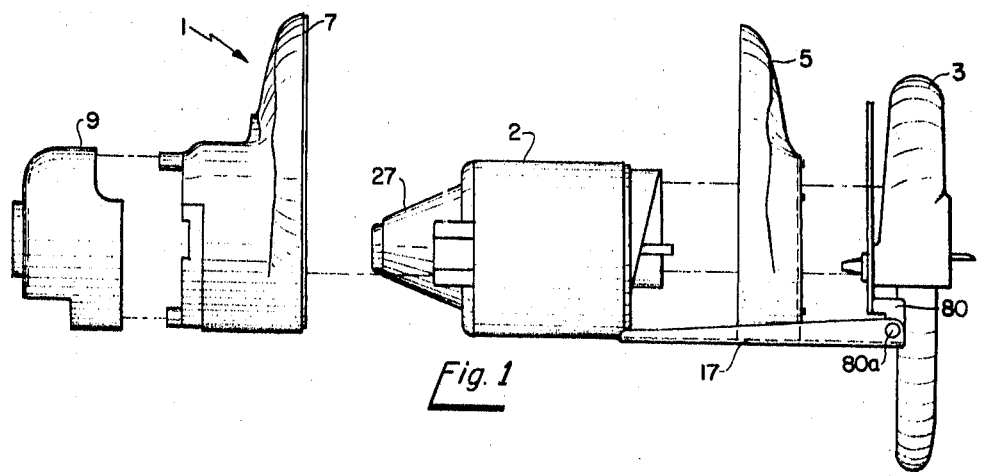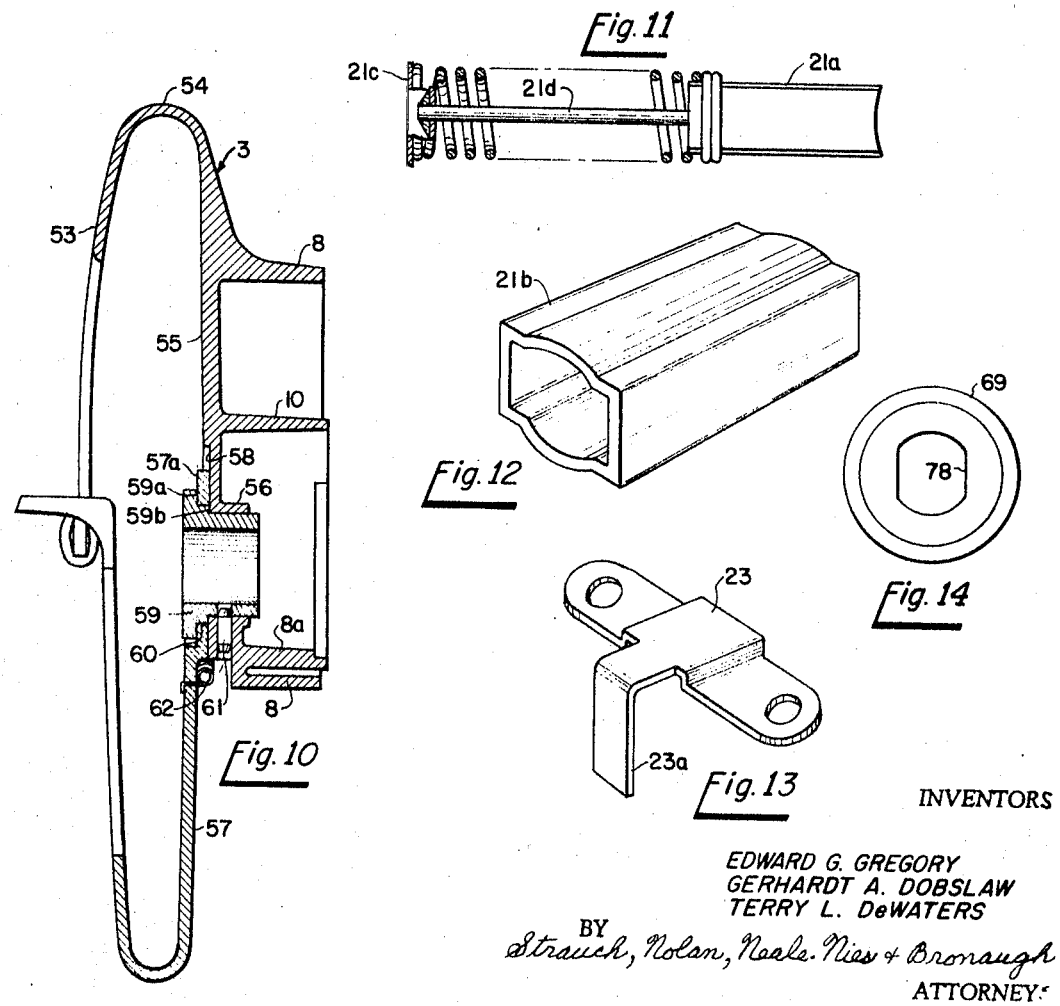

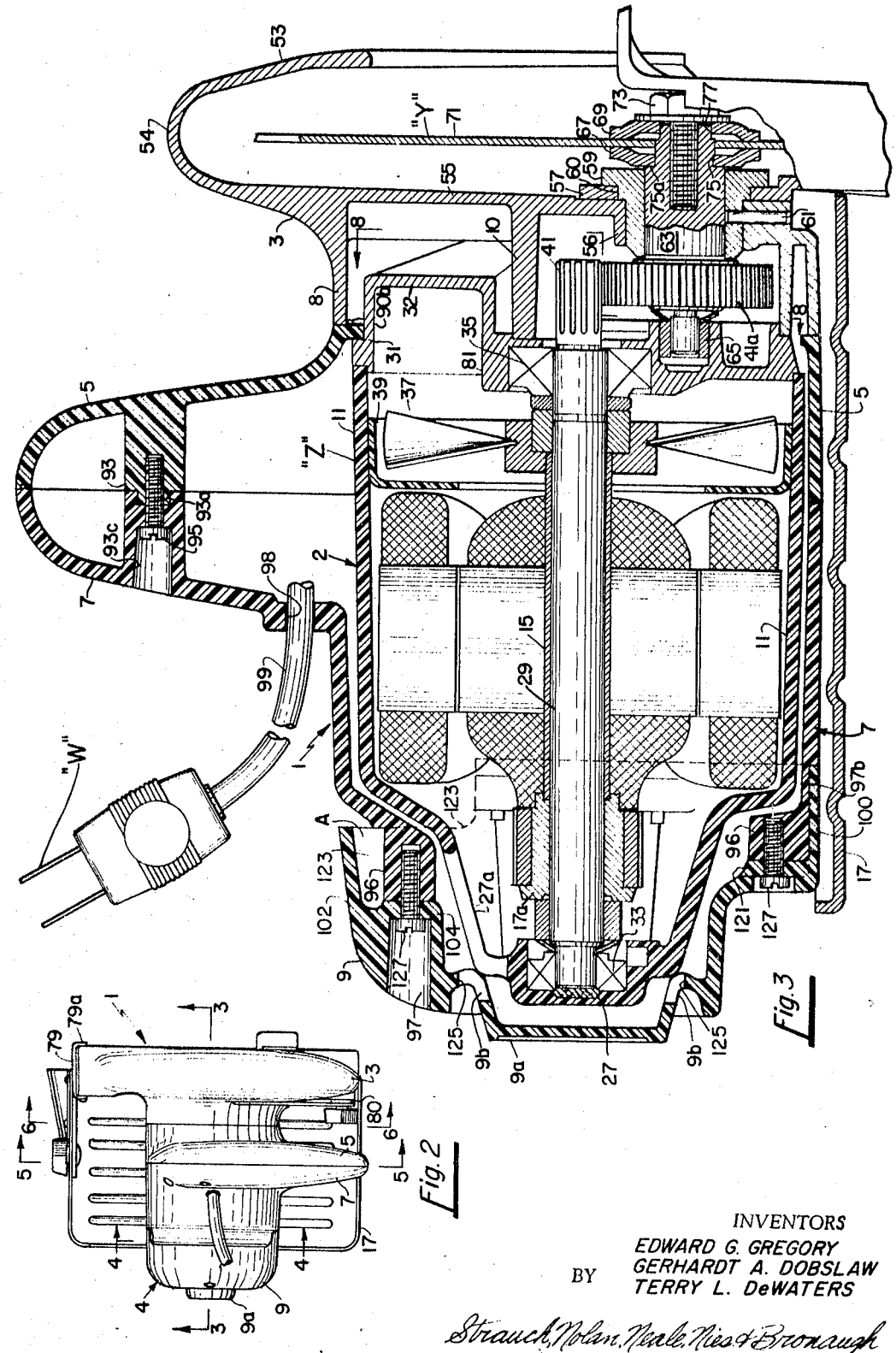

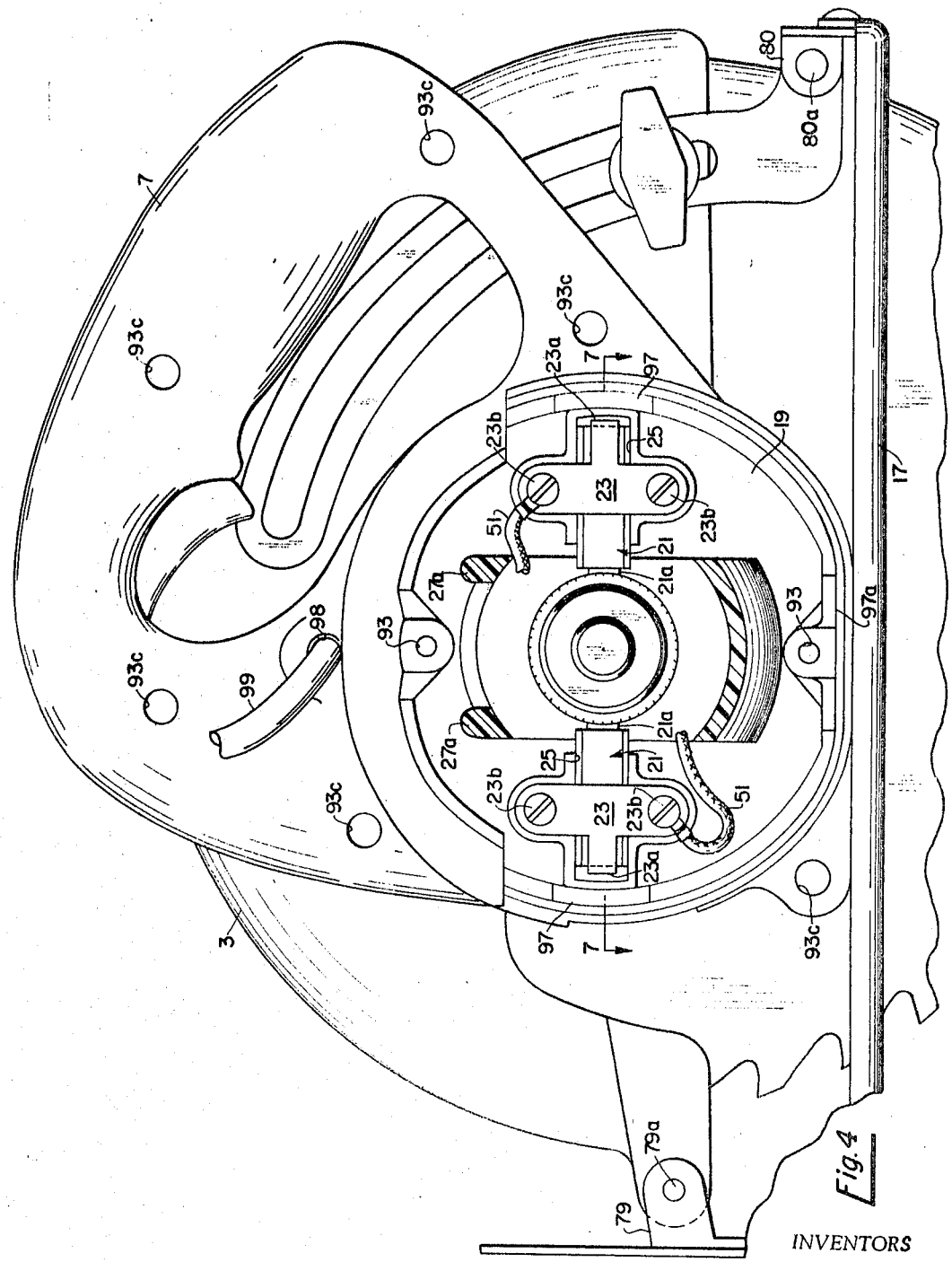

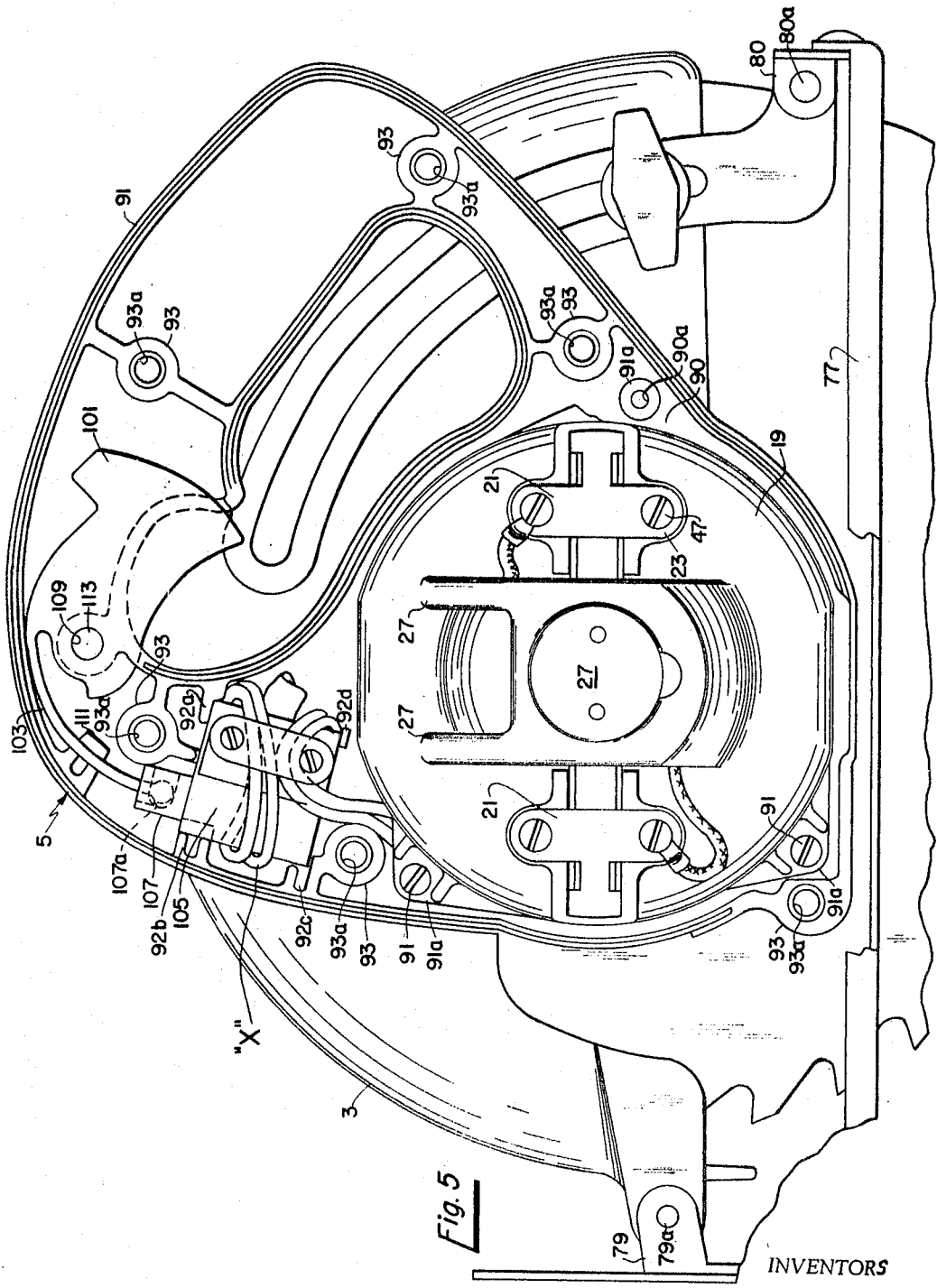

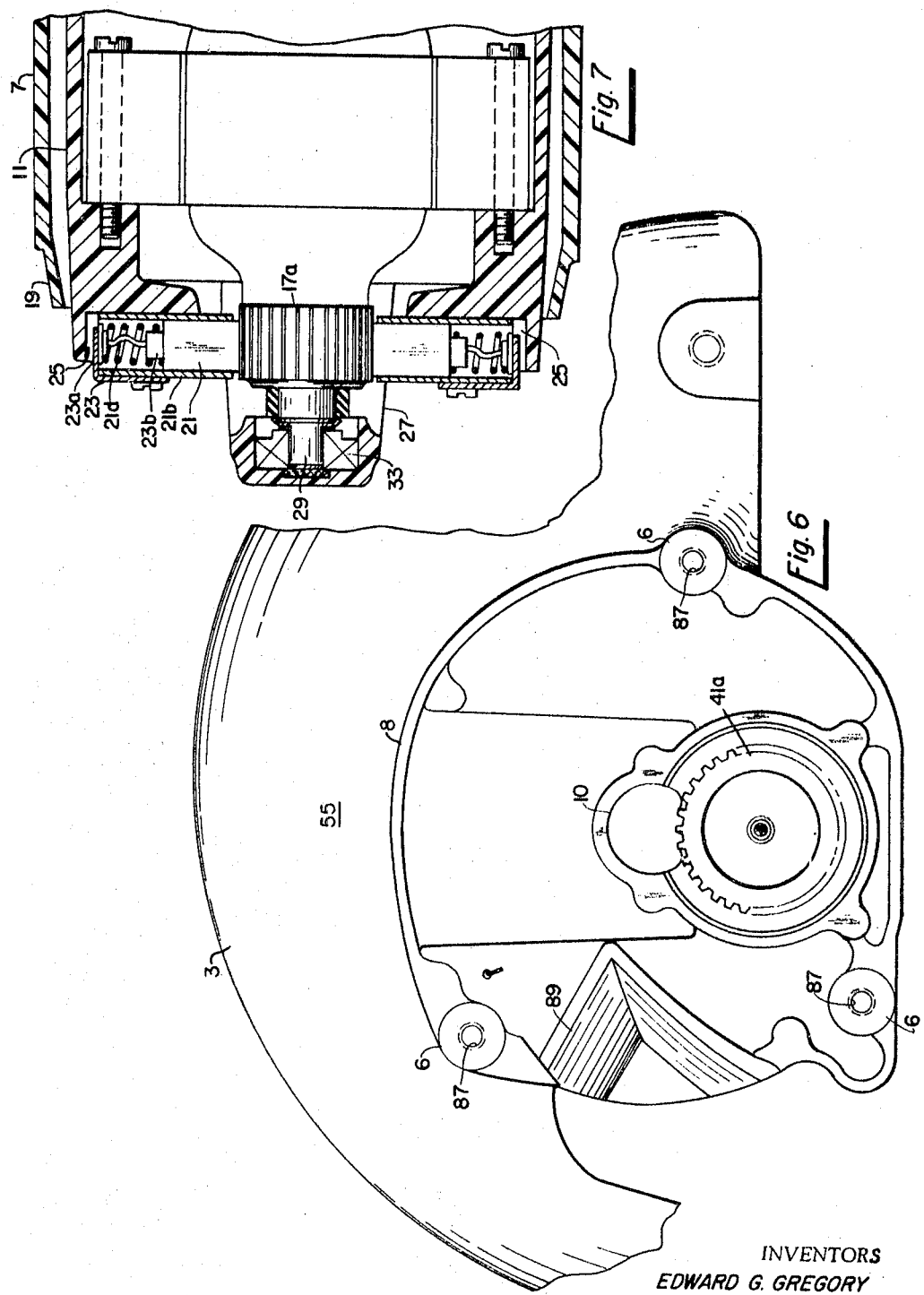

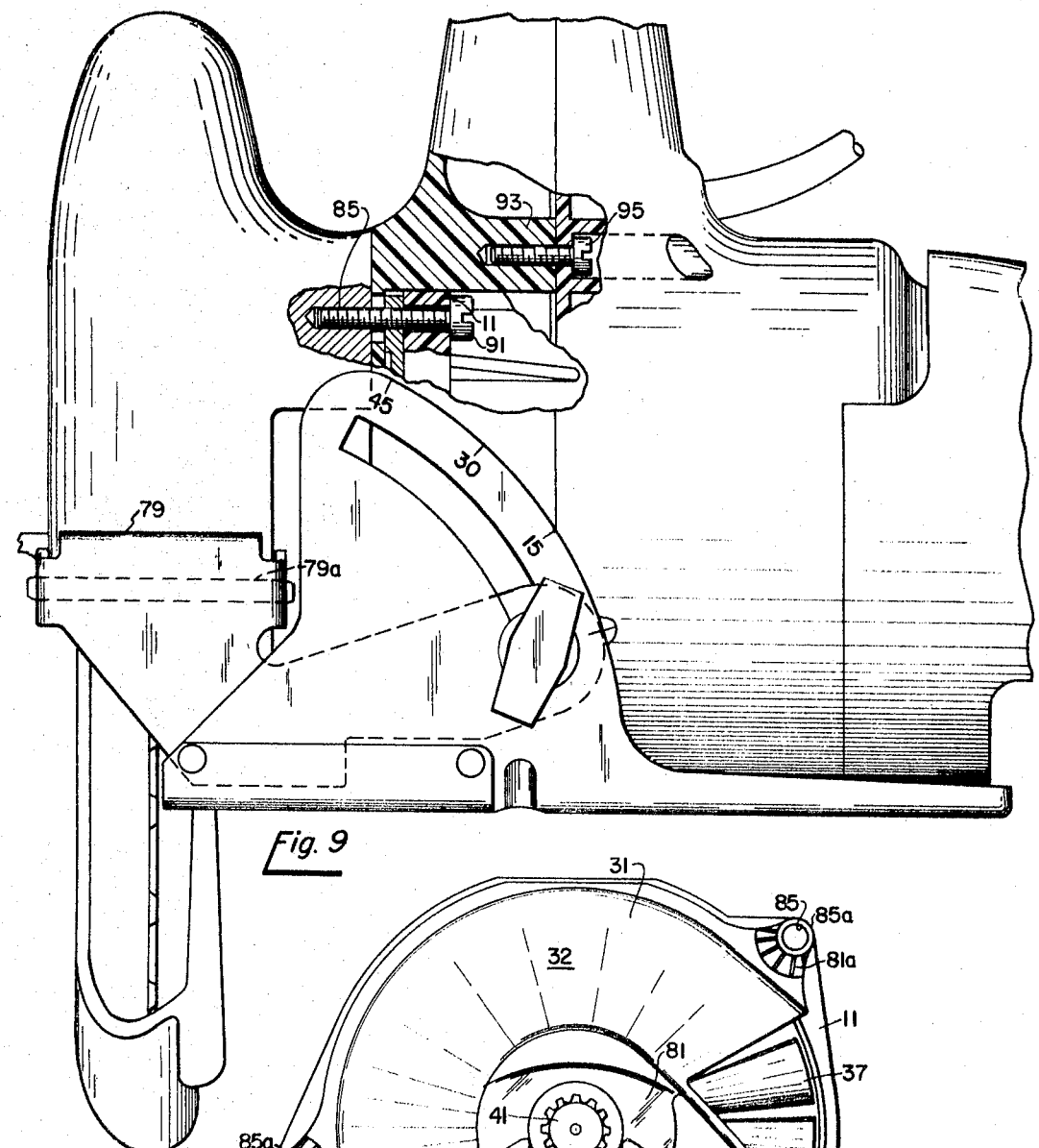

3,456,696
PORTABLE CIRCULAR SAW
Edward G. Gregory, North Syracuse, Gerhardt A. Dobslaw, Fayetteville, and Terry L. De Waters, Syracuse, N.Y., assignors to Rockwell Manufacturing Company, Pittsburgh, Pa., a corporation of Pennsylvania
Filed July 13, 1966, Ser. No. 564,907
Int. Cl. B27b 9/00, 5/00
U.S. Cl. 143—43                                   15 Claims

ABSTRACT OF THE DISCLOSURE

A portable circular saw composed of separable motor and tool assemblies wherein the motor assembly is double insulated electrically through the provision of a rigid motor casing of dielectric phenolic material closed at one end by a centrally apertured closure plate mounting a bearing supporting the output end of the motor shaft and formed with a peripherally disposed abutment flange formed with an insert annular centering flanged interfitted in the one casing end to abut its flange and the one casing end ad formed at the other end to provide a radial wall having diametrically opposed brush assembly receiving troughs on its outer face and a spider supported coaxial extension recessed to mount an outboard motor bearing and permitting entry of cooling air and a multi-section outwardly spaced shock resistant dielectric housing composed of an end section which encloses the other casing end, including the brush assemblies in the troughs, and is recessed axially and apertured annularly to provide cooling air inlet passages and an intermediate section and a mounting section adapted when assembled to form a hollow handle and annularly house the motor casing. The hollow handle houses a pivoted dielectric trigger-like operator and a plunger switch and the mounting section is provided with an annular inwardly directed mounting flange disposed and dimensioned to abuttingly engage and be sandwiched between the closure plate abutment flange and an abutment flange formed by the free end of an axially directed, eccentrically related outer annular wall of the tool assembly which also provides a concentrically related inner annular wall defining with the opposing face of the closure plate adjacent and surrounding the protruding motor shaft a housing for the tool assembly mounted arbor shaft and drive gear. A series of headed screws freely passing through countersunk openings in the intermediate housing section and mating bolt openings in the mounting housing section and closure plate abutment flanges into tapped openings in the tool assembly abutment flange clamp the outer housing mounting flange between the closure plate and tool assembly abutment flanges to mount the protective housing in encircling relation to the motor casing.

---

This invention pertains to power-driven hand tools and specifically to improvements in saws such as disclosed in the prior United States Letters Patent to Hartman et al., No. 2,765,824, of Oct. 9, 1956, for "Portable Power Operated Saw," and to Emmons, No. 2,861,605, of Nov. 24, 1958, for "Jack Shaft and Guard Unit for Wood Working Saws."

A primary object of this invention is to provide an electric motor driven hand tool constructed to minimize impact damage when dropped and greater operator protection in use from the hazards of high speed operation and the electrical charges from current carrying components.

A further important object of this invention resides in the provision of an electric motor driven hand tool having an electrically non-conductive motor casing, a stationary tool guard or housing structure having a mounting web adapting it for end connection to an end of the motor casing, and a light weight, electrically non-conductive housing of mildly yieldable, impact resistant, plastic, web connected between the tool guard mounting web and motor casing end to dispose the housing in outwardly spaced enclosing relation to the motor casing and provided adjacent its web connection with an arcuate handle thereby isolating the operator from the motor casing and all electrically conductive parts and providing a yieldable cushioning enclosure capable of absorbing impact forces from all directions encountered in normal motor driven hand tool usage.

A still further specific object of this invention resides in the provision of an electric motor having a casing of dielectric material and a rotor shaft insulating sleeve of heavy dielectric material fully insulating the shaft from the wiring, and other current conducting elements of the motor.

A further object is to provide a dielectric housing for a hand tool which, in addition to providing electrical insulation, is constructed to yieldingly absorb mechanical shock and to protect the motor and tool drive parts therewithin.

A further object of this invention is to provide a protective housing comprised of interfitting dielectric, plastic sections which facilitate manufacture and assembly, reduce the overall cost, provide mechanical shock and electric insulating properties, and are readily and inexpensively replaceable in event of breakage.

It is a further object of this invention to provide for assembly of the protective housing to the motor casing end wall through a web clamped thereto by other parts of the hand tool in a sandwich-like fashion, thereby to obtain proper orientation and reduce assembly costs of the device.

Another object of this invention is to provide a housing of sectional construction forming a composite, integral handle, and an improved switch and trigger operating mechanism within said handle.

Another object of the invention is to provide an improved, one piece motor case of dielectric material having provisions for convenient mounting and adjustment of the commutator brushes therein.

Still another object of this invention resides in the provision of an improved movable guard and saw arbor mounting bushing for a circular saw, which facilitates assembly and improves accuracy thereof.

Another important object is to provide an improved saw blade mounting structure which eliminates binding and facilitates change of blades.

The above and other objects of this invention will become apparent from the claims and from the description as it proceeds in connection with the drawings which show a preferred embodiment applied.

In the drawings, FIGURE 1 is an exploded elevation view showing the sectional construction of the housing and its relation to other parts of the hand tool.

FIGURE 2 is an overall top view of the device, on a reduced scale, with details omitted.

FIGURE 3 is a cross sectional view on line 3—3 of FIGURE 2.

FIGURE 4 is an end view of the device with the motor sidewall enclosing section of the housing removed.

FIGURE 5 is an end view of the device looking from the left side of FIGURE 2, with the cap section of the housing omitted.

FIGURE 6 is a fragmentary vertical view along line 6—6 of FIGURE 2, with the housing and motor removed.

FIGURE 7 is a fragmentary, and partly sectional view along line 7—7 of FIGURE 4, showing the brush and commutator end of the motor.

FIGURE 8 is a view of the opposite end of the motor substantially on line 8—8 of FIGURE 3.

FIGURE 9 is a partly sectional, fragmentary view looking into the front of the tool or down upon the upper face of FIGURE 2.

FIGURE 10 is a vertical section of the stationary and movable guard assembly alone taken substantially along line 3—3 of FIGURE 2, but looking in the opposite direction.

FIGURES 11–13 show details of the electric brush assembly.

FIGURE 14 shows the outer saw blade retaining disc of the saw mounting assembly.

Referring to FIGURES 1, 2 and 3, it will be seen that the saw 1 of this invention comprises a motor assembly 2, a blade guard assembly 3, and an exterior housing 4 (FIGURES 2 and 3) which is composed of three distinct sections.

The blade guard assembly 3 is constructed of aluminum, all exteriorly accessible surfaces of which are heavily coated with an insulating layer of enamel and rotatably mounts the blade as hereinafter pointed out. This section has an inner wall 55, and an outer rim-like wall 53 in axially spaced relation connected by an arcuate annular wall 54 (shown best in FIGURES 3 and 10). These walls together form a stationary guard for rotary saw blade 71 mounted on arbor 63, for rotation within the guard.

The arbor 63 is journalled in a bronze bushing 59, which is fitted into the bore of a circular hub portion 56 formed on wall 55. As best shown in FIGURES 3 and 10, the outer periphery of bushing 59 is provided with two axially spaced, radially concentric shoulders 59a and 59b which delineate three contiguous external cylindrical surfaces. The relatively narrow cylindrical surface 60 between shoulders 59a and 59b serves as a bearing support for movable guard 57 which freely pivots thereon. The minor dimensioned cylindrical surface of bushing 59 (FIGURE 10) closely fits the hub bore in wall 55 where said bushing is retained by roll pin 61. Bushing 59 is entered into the hub bore after movable guard 57 is assembled loosely on surface 60 against shoulder 59a until shoulder 59b abuts the recessed face 58 of wall 55 leaving bearing area 60, which is of slightly greater length than the thickness of hub 57a of guard 57, to assure freedom of movement of the hub on the bearing surface. The movable guard is, therefore, trapped in place between wall 55 and shouder 59a of the bushing.

Movable guard 57 is spring biased toward saw enclosing position by tension spring 62 (FIGURE 10), connected at its opposite ends to guard 57 and to wall 55, and is moved away to permit sawing by engagement with the material to be cut, in conventional manner.

The blade guard assembly wall 55 on the side away from the blade is best illustrated in FIGURE 6. It carries an outer generally ovate wall 8 which is interspersed at non-equally spaced angular distances with thickened tapped bosses 6 formed to receive screws for coupling the blade guard assembly and adjoining section of the housing to the motor casing mounting ears 91a (FIGURE 5) to be hereinafter more fully described. In addition, the blade guard assembly wall 55 within and adjacent the bottom run of wall 8 carries a wall 10 of general figure 8 configuration defining a gearing housing the larger lower portion of which is concentric with hub portion 56 and the smaller upper portion of which is in vertically spaced alignment with the centerline of hub portion 56.

In assembling the guard assembly 3, movable guard 57 is slipped over the bushing onto its journal portion 60, and then the bushing is inserted into the hub of plate 55 where it is locked by pin 61. Arbor 63, having gear 41a and reduced diameter, cylindrical terminal portions formed therewith, is then inserted through the gear housing and saw blade 71 is relatively rotatably mounted on the larger terminal portion 75 of arbor 63 by way of friction discs (washers) 67, 69 and clamp screw 73 (FIGURE 3) in such a way as to permit slip on overload and to avoid jamming. To this end, cylindrical portion 75 extending from shoulder 75a to the end thereof is tapped to receive retaining screw 73 and formed with diametrically opposed flats 77. As shown in FIGURE 3, disc 67 mounted against shoulder 75a, and saw blade 71 have circular bores and are freely rotatable on arbor portion 75. However, the second disc 69 has a flat sided hole 78, as shown in FIGURE 14, which non-rotatably mates with flats 77 of cylindrical portion 75. Saw blade 71 is non-rotatably fixed to arbor 63 solely by the compressive (frictional) clamping effect of discs 67 and 69 determined solely by manual tightening of clamp screw 73. The mounting, accordingly has no self tightening or freezing tendency due to blade inertia and other stresses, which defect is commonly encountered in prior hub saw mountings. Another defect of prior art blade mountings has been the tendency of the saw blade, when stuck in the work, to stall the outer disc (in this case, 69) with the blade and exert a tightening torque on the clamp screw 73. This is a progressive effect, in that the more the clamp screw is turned relative to the shaft 63, the tighter the assembly becomes, and the more torque is transmitted from the blade 71 through outer disc 69. This has progressed in some cases to the point where the head of clamp screw 73 is twisted off the threaded body of the screw. The provision of flats 77 on cylindrical portion 75 and flat sides on hole 78 of outer disc 69 guarantees that the outer disc will continue to turn with the shaft 63, thus preventing the transmission of turning torque to clamp screw 73.

It will be seen from the foregoing that a complete blade bearing sub-assembly, including the stationary guard, the movable guard, the blade, and the blade drive gear and arbor is provided for unitary mounting with respect to motor 2 and section 5 of the dielectric housing. This sub-assembly 3 is pivotally adjustably mounted on base plate 17 through brackets 79 and 80 for depth of cut and angle of cut adjustment respectively around pivots 79a and 80a (see FIGURES 2, 4, and 5, and 9). The exterior surfaces of the guard elements of this sub-assembly being heavily enameled provide an extra layer of insulation at the cutting end of the saw.

The motor case 11 of motor assembly 2 is moulded of asbestos filled phenolic material "Durez." It is cylindrical for the major portion of its length, open at one end and is provided with apertured ears 91a at the open end. The bearing for the open end of the motor shaft is carried by a die cast zinc cover plate 31 axially flanged to fit in the open end of motor casing 11, formed with ears carrying through apertured bosses 85 (FIGURE 8) overlying motor casing ears 91 and having ends 85a projecting axially from the face remote from motor casing 11 and serrated abutment surfaces 81a adjacent boss 85. Cover plate 31 below the protruding end of motor shaft 29 is provided with a vertically aligned boss having a blind bore mounting a brass sleeve bearing 65 and an annular wall segment 65b notched in its upper portion to pass the protruding end of shaft 29 which is provided with gear teeth to form main drive pinion 41. Annular wall segment 65b is adapted to interfit with the lower portion of wall 10 of guard assembly 3 to coaxially relate the reduced diameter end of arbor shaft 63 with sleeve bearing 65 and assure proper meshing engagement of pinion 41 and arbor gear 41a. The end wall of plate 31 above the protruding end of shaft 29 is formed to provide an arcuate passage wall 32 (FIGURES 3 and 8) opening to the right as seen in FIGURE 8 to discharge cooling air passing through the motor downwardly at an inclination to the area of the blade as it leaves the workpiece. This discharged air disperses the sawdust on the surface of the workpiece aiding the operator in following his cutting work.

The end of motor casing 11 opposite the open end is formed with a center opening and an axially directed generally conically shaped hub-like extension 27 recessed centrally in coaxial relation to motor shaft 29 to receive outboard motor bearing 33 and open at its sides and top, except for strut members 27a, to expose the commutator mounted on motor shaft 29. Diametrically disposed at the open sides of hub-like extension 27 the motor casing end wall is provided with inwardly and axially opening trough-like recesses 25 (FIGURES 4 and 7) to receive and mount brush assemblies 21 for ready access for replacement and servicing.

Each brush assembly 21 consists of a brass bushing 21b (FIGURES 7 and 12) which receives the brush 21a, spring, and cap assembly 21c axially movably secured to brush 21a by insulated wire 21d (FIGURE 11) and a retaining brass clip 23. In assembling the brush structure in place, the brush 21a, along with its spring and cap are inserted into bushing 21b, and the assembly is then placed into its recess 25 in the motor case. Clip 23 (FIGURE 13) is then placed over bushing 21b with its right angle lip 23a extending into recess 25 behind cap 21c. Clips 23 are respectively fastened to the motor cover plate by screws 23b. In addition to retaining the brush assemblies in place, clips 23 and screws 23b serve to make electrical connections between the brushes and stator winding leads 51, as best shown in FIGURE 4.

Housing section 5 is mounted immediately adjacent subassembly 3 in clamped sandwich relation between motor casing end plate 31 and the end face of wall 8 of guard assembly 3. To this end, housing section 5 is provided with an annular, inwardly directed, planar flange 90 (FIGURE 3) having angularly spaced through holes 90a (FIGURE 5) arranged to axially coincide with bosses 6 of guard assembly wall 8 and bosses 85 (FIGURE 8) of motor end plate 31 and a series of pin-like centering protuberances 90b (FIGURE 3) radially disposed to abuttingly engage the inner face of guard assembly wall 8. Through holes 90a, as will be clear from an inspection of FIGURES 5 and 8, are of greater diameter than the protruding ends 85a of bosses 85 to freely encircle these ends.

Assembly of housing section 5 with motor assembly 2 and guard assembly 3 is effected by positioning rim 90 to receive ends 85a of motor end plate bosses 85, inserting securing screws through ears 91a of motor casing 11 and motor end plate bosses 85 and positioning guard assembly 3 to receive the three securing screws in the tapped bosses 6 and tightening the securing screws to draw guard assembly 3 toward motor end plate 31 until rim 90 of housing section 5 is tightly clamped between the end face of wall 8 and the opposing annular abutment face of end plate 31. This tight clamping engagement causes serrations 81a to bite into the plastic face of rim 90 of housing section 5 fixing housing section 5 in sandwich fashion against relative movement with respect to end plate 31 and motor casing 11 and retains pinion 41 with arbor gear 41a while drawing guard assembly wall 10 into interfitting cooperation with annular wall segment 65b of motor casing end plate 31.

With housing section 5 fixed in place in this manner the cylindrical body portion will encircle motor casing 11 in radially spaced relation (see FIGURES 3 and 5) and the integrally formed hollow, half handle portion 91 will be disposed in clockwise offset relation to a vertical axial plane through the motor housing as shown in FIGURE 5.

Handle portion 91 of section 5 in counter clockwise offset relation to the aforesaid axial plane is widened laterally of the motor housing to provide a pocket to receive a precision snap switch (commonly known as a microswitch) 105. To this end the widened pocket section of half-handle portion 91 is provided with upstanding rib formations 92a, 92b, 92c and 92d to form positioning seat formations to closely fit the corners of microswitch 105 and position the switch against relative movement in half-handle portion 91. As best seen in FIGURE 5 microswitch 105 is of generally rectangular configuration and is provided at its upper left hand corner with a contact operating plunger 107. Plunger 107 is biased outwardly to open contact position. A guide rib assembly 111 is provided in handle portion 91 adjacent the outer end of plunger 107 to slidingly receive a tongue-like plunger operator 103 formed as an integral part of a pivoted trigger 101 and terminating in a ball shaped end adapted to fit in a mating socket in plunger 107 to form a ball and socket connection 107a between plunger 107 and plunger operator 103. Microswitch 105 is firmly retained in place by matching rib formations (not shown) provided in the half-handle portion of housing section 7 when it is assembled in place.

The hollow side of handle section 5 is also provided with six upstanding threaded bosses 93 the outer faces of which lie in co-planar relation to the grooved end face (FIGURES 3 and 5) of the cylindrical body portion and half-handle portion 91. Each boss 93 has an upstanding annular positioning protuberance 93a coaxially related to the tapped bore and adapted to interfit with a mating recess (FIGURE 3) of cooperating housing section 7.

Trigger 101 has the configuration shown in FIGURE 5. It is molded of polypropylene plastic integrally with its elongated, flexible tongue 103 and oppositely directed pivot bosses 113, which are matingly journalled in respective blind bores 109 of integrally formed upstanding bosses provided in mating housing sections 5 and 7, that of section 5 only being illustrated in FIGURE 5 in dotted lines. Tongue 103 of the trigger is guided for axial sliding movement about midway its length by rib assemblies 111 of the mating sections 5 and 7 and at its switch end by the ball and socket coupling 107a with plunger 107. When the trigger is actuated, tongue 103 moves lengthwise and pushes plunger 107 inwardly to circuit closing position.

The mating faces of housing sections 5 and 7 are substantial mirror images except that the main wall face of section 7 has a protruding rib to interfit the groove of housing section 5 and bosses 93b having through stepped bores 93c to freely pass housing securing screws 95 and enlarged ends to respectively receive protuberances 93a of housing section 5 and the heads of securing screws 95. Housing section 7 is additionally provided with a through passage 98 (FIGURES 3 and 4) to pass power cord 99 out through the casing toward the end opposite that carrying the guard assembly 3. As best seen in FIGURES 1 and 3, the main body portion of housing section 7 encloses the motor case 11 in radially spaced relation and follows down around the back end of motor casing 11 to terminate in upper and lower end face segments disposed in radial outwardly spaced relation to the inner end of hub-like extension 27 of the motor casing and formed in vertically aligned relation to provide diametrically oppositely related thickened threaded bosses 96 for mounting housing section 9. As best seen in FIGURE 4, the lower end face segment is offset radial outwardly from the upper section, notched at diametrically opposite sides at 97 opposite brush recesses 25, and flattened at 97a at the bottom. Viewed from the side as seen in FIGURE 3, the lower end face segment is offset axially inwardly from the upper end face segment to form an annular radially inset wall segment 97b extending between a point above the center line of the motor housing at one side to a similar point above the center line of the motor housing at the opposite side.

End cap section 9 is formed to cooperate with the end face segments of housing section 7 and provide a semi-circular air inlet passage A between the upper end face segment and cap section 9. To this end, cap section 9 is formed to provide a flat bottomed lower annular section 100 having a thickened apertured boss 121 apertured to freely pass a securing screw 127 to be threaded into lower tapped boss 96 of housing section 7 and a mating annular wall snugly receiving the radially inset wall segment 97b of housing section 7. The upper body portion 102 of end cap section 9 comprises an annular continuation of lower annular section 100 which lies radially outwardly of the upper end face segment of housing section 7 and is relieved at 123 (FIGURE 3) to form the outer wall of air passage A. Diametrically opposite boss 121 end cap section 9 is provided with a long apertured boss 104 dimensioned to freely pass a securing screw 127 to be threaded into upper tapped boss 96 of housing section 7. Upper body portion 102 merges through an axially curving transition section to define a recessed opening 125 concentrically related to bearing support member 27 of housing section 7. Opening 125 is partially closed by an axially protuberant disk-like end closure member 9a supported by four angularly spaced integrally formed spiders 9b. As housing sections 5, 7 and 9 are constructed as respective integral mouldings of dielectric polymer (such as General Electric Co. "Lexan 101"), the outer housing and end closure member 9a form a yielding shock resistant enclosure as well as a dielectric housing. Furthermore, switch 105 and trigger 101 are preferably formed of a nonconductive material possessing self lubricating properties which make for smooth and non-sticking lifetime operation of the switch.

Assembly and disassembly of housing sections 7 and 9 as a unit can be effected, if desired, merely by removal of the six screws 95 provided to secure sections 5 and 7 in assembled relation. To gain access to the brushes, end cap section 9 alone can be removed by removal of the two screws 127 securing it to housing section 7. Any of the protective housing parts can be readily replaced, if they should become broken in use.

Furthermore the motor assembly 2 constitutes a separate unit (see FIGURE 1) adapted for use in a variety of hand tools and the protective housing by appropriate relocation of the handle portions can be modified for use on a wide variety of hand tools.

Adequate quantities of air to cool the motor during operation flow into the motor case through air inlet passage A and the annular passage provided by opening 125 and end closure member 9a, and the open wall portion of hub-like extension 27 under influence of motor fan 37 (FIGURES 3 and 8).

With the operating parts and the housing assembled as described it will be appreciated that the present invention provides at least three layers of insulation between current carrying portions of the motor and the exterior, namely, the dielectric plastic motor case 11, the outer dielectric housing, and air space between the casing and the housing.

In addition, the motor shaft 29 is completely insulated from the armature assembly by dielectric sleeve 15 which extends from the commutator 17a (on the left FIGURE 3) to fan 37 (on the right). To further preclude possible contact of current bearing parts of the motor, such as armature and field, with rotating parts thereof, an insulating fiber baffle plate 39 is inserted into motor casing 11 just to the left of the motor fan. This baffle plate fits snugly into the interior of motor case 11 and has a large central opening concentric with motor shaft 13 to provide for free air passage to the fan.

As a result of the above construction the saw of this invention will meet the following dielectric test: (A) 60 cycle, 1000 volt potential applied between points W and X (FIGURE 5), prior to assembly of the plastic housing, with switch on and without current flow for one second; (B) 1500 volts applied between Y and Z and Y and X (FIGURES 3 and 5) before plastic housing assembly; (C) 2500 volts applied between Y and W after completion of plastic housing assembly.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An electric shock resistant and impact resistant hand power tool comprising an electric motor assembly including a rigid stress resisting dielectric motor casing, a motor output shaft protruding from one end portion of said casing and journalled at its other end in said casing, a dielectric motor shaft sleeve isolating the motor shaft from the current carrying motor components; and an impact resistant dielectric housing enclosing said motor casing in outward spaced relation along the length and opposite end portion thereof and including attaching means fixed to said motor casing at said one end portion and hollow handle means; switch means housed in said hollow handle means including a dielectric switch operator accessible to the operator for controlling the motor; and tool means fixed to said one end portion of said motor casing and drivingly connected to said output shaft.

2. A hand power tool according to claim 1 wherein said means fixed to said motor case yieldingly supports said dielectric impact resistant housing to isolate said motor assembly from mechanical shock due to impact forces.

3. A hand tool according to claim 1, wherein said housing comprises a plurality of axially juxtaposed mating sections, said section being separable from one another to gain access to the motor casing for servicing the motor and for independent replacement in event of breakage and including a support section and an intermediate section defining said hollow handle means and an end section enclosing said other casing end portion.

4. A hand tool according to claim 1, wherein said means for mounting said subassembly comprises a stationary circular saw blade guard segment including a wall means, a bearing support opening in said wall means formed at least in part by a hub formed on said wall means, a sleeve bearing fixed in said bearing support opening and providing stepped shoulder means at one end having a journal portion dimensioned to abut said wall means in surrounding relation to said bearing support opening, said sleeve bearing and said hub being radially drilled and fitted with a pin to fix said bearing in said bearing support opening; and a movable circular saw blade guard segment journalled on said journal portion of said sleeve bearing and having a biasing spring fixed at its opposite ends to said respective guard segments to bias said movable guard segment to normal blade encircling position between the ends of said stationary guard segment.

5. A hand tool according to claim 4, wherein said tool means comprises a subassembly including drive means adapted for driving connection to said motor shaft and means for mounting said subassembly on said one end portion of said motor casing with said impact resistant housing attaching means clampingly sandwiched between said motor casing and said mounting means of said tool subassembly.

6. A hand tool according to claim 5, wherein said housing attaching means has oversize screw receiving openings therein, said end portion of said motor casing has screw receiving openings therein disposed for mating association with said oversize openings of said housing means and serrated wall surfaces radially related to said screw receiving openings disposed to abuttingly engage said housing attaching means, said mounting means of said tool subassembly has tapped screw receiving openings disposed for mating association with said screw receiving openings of said housing means and motor casing end portion and headed securing screws freely passing said screw receiving openings of said housing means and said motor casing end portion and threaded into said tapped openings of said tool assembly are provided to draw said tool subassembly and said housing means toward said motor casing end portion to clampingly secure said housing means against said serrated wall surfaces thereby embedding said serrations in said housing means to fixedly assembly said housing and said motor casing end portion.

7. A hand tool according to claim 3, wherein said juxtaposed mating housing sections include an end closure cap of generally cup shaped configuration having an end wall providing a recessed opening spanned by an axially protuberant end closure member yieldingly supported concentrically within said opening by spaced spider arms to form a shock absorbing element, and arcuate air inlet passages around said end closure member.

8. A hand tool according to claim 7, wherein said end closure cap includes an annular wall which extends axially throughout its lower portion to enclosingly engage the adjacently related housing section and is axially foreshortened and radially inset throughout its upper portion to provide an arcuate air inlet opening between said upper portion and the adjacently related housing.

9. An hand tool according to claim 3, wherein said motor casing opposite end portion is formed to provide an inwardly directed annular wall section defining a centered opening intersected by diametrically opposed troughs open at their inner opposed ends to provide brush receiving recesses and axially directed wall segments angularly spaced at opposite sides of said opposed troughs extending beyond said annular wall section and terminating in an end wall member recessed in its inner face to form a bearing seat for an outboard motor shaft bearing.

10. A hand tool according to claim 9, wherein said juxtaposed mating housing sections include an end closure cap of generally cup shaped configuration enclosingly surrounding said motor casing opposite end and independently removably secured to the adjacently related housing section to gain access to said brush troughs.

11. A hand tool according to claim 9, wherein said electric motor is mounted in said motor casing with its commutator disposed between said brush receiving recesses and a brush assembly comprising respective brush holders disposed in said brush receiving recesses respective brushes slidingly mounted in the inner ends of said brush holders, brush biasing springs and contacts respectively associated with said brushes and said brush holders to dispose said contacts outwardly of the outer ends of said brush holders; respective brush assembly retainer clips each including a main strap-like body portion having screw passages adjacent its opposite ends and a right angularly related contact engaging leg disposed to overlie the outer ends of said brush holders and engage said respective contacts; and respective sets of securing screws for securing said clips to said motor casing through said strap-like body portion overlying and clamping said brush holders in said brush receiving recesses, one screw of each set of securing screws also serving to secure one of the motor armature leads to its respective said retainer clip to electrically connect said brushes in the motor circuit.

12. A hand tool according to claim 1 wherein said switch means comprises a switching unit including a plunger normally biased on one direction to open circuit position, a trigger-like pivotally mounted switch operator including an elongated strip-like force transmitting member extending between said switch operator and said plunger within housing guide formation, a ball and socket connection between said plunger and force transmitting member, said plunger, operator and force transmitting member being constructed of dielectric material.

13. A hand tool according to claim 12 wherein said hollow handle means comprises separable half handle sections formed in respective mating housing sections, each half handle section comprising upstanding rib members supportingly engaging a side face and edge face of said plunger operated switch to fixedly mount said switch against bodily relative movement to the respective half handle sections, upstanding bosses spaced from said rib members along said half handle section and providing pivot means for said trigger, and guide ribs disposed between sand support rib members and said bosses for slidingly receiving and imparting operative rigidity to said strip-like force transmitting member to assure positive plunger action and trigger restoration under influence of the plunger biasing means.

14. A hand tool switching mechanism comprising a plunger operated switch having an axially shiftable plunger normally biased in one direction and having an exposed end providing an end slot communicating with side entry ball socket, a trigger-like pivoted switch operator including a flexible tangentially directed force transmitting, elongated tongue extending from said switch operator and terminating in a ball formation interfitted in said socket to connect said tongue and plunger whereby operation of the trigger displaces said plunger against its bias which serves to restore the trigger to and maintain it in its normal off position.

15. A circular saw assembly for operative association with a drive motor having a protruding shaft at one end comprising a stationary circular saw blade guard segment including wall means having a bearing support opening and means for mounting said assembly to said drive motor, a sleeve bearing fixed in said bearing support opening having a through bore therein and stepped shoulder means at one end having a journal portion dimensioned to said wall means in surrounding relation to said bearing support opening, a movable circular saw blade guard segment journalled on said journal portion of said stepped shoulder means, a biasing spring fixed at its opposite ends to said respective guard segments to bias said movable guard segment to normal blade encircling position between the ends of said said stationary guard segment, a blade arbor having a gear formed at one end and a reduced diameter end portion at the opposite end provided with an axially opening tapped blind bore, and a circular saw blade frictional drive connected to said reduced diameter arbor end.

References Cited

UNITED STATES PATENTS

| | | | |
|---|---|---|---|
| 1,751,781 | 3/1930 | Weiss | 200—157 |
| 2,324,299 | 7/1943 | Haifley et al. | 310—239 |
| 2,861,607 | 11/1958 | Emmons | 143—43 |
| 2,993,518 | 7/1961 | Bork | 143—155 X |
| 3,121,813 | 2/1964 | Pratt et al. | 77—7 X |
| 3,266,535 | 8/1966 | Brodie | 143—155 |
| 3,303,366 | 2/1967 | Elson et al. | 310—50 X |
| 3,344,291 | 9/1967 | Pratt | 310—50 |

FOREIGN PATENTS 744,948  2/1956  Great Britain.

FRANCIS S. HUSAR, Primary Examiner

U.S. Cl. X.R.

77—7; 143—155; 200—157; 310—50, 239

UNITED STATES PATENT OFFICE
CERTIFICATE OF CORRECTION

Patent No. 3,456,696

July 22, 1969

Edward G. Gregory et al.

It is certified that error appears in the above identified patent and that said Letters Patent are hereby corrected as shown below:

Column 1, line 22, "ad" should read -- and --. Column 3, line 49, "shouder" should read -- shoulder --. Column 8, line 30, "section" should read -- sections --. Column 9, line 23, "An" should read -- A --. Column 10, line 11, "sand" should read -- said --; line 42, cancel "said", first occurrence.

Signed and sealed this 31st day of March 1970.

(SEAL)
Attest:

Edward M. Fletcher, Jr.
Attesting Officer

WILLIAM E. SCHUYLER, JR.
Commissioner of Patents